Patented Sept. 14, 1948

2,449,140

UNITED STATES PATENT OFFICE 2,449,140

METHOD OF ENHANCING THE YIELD OF VITAMINS IN FERMENTATIONS

Henry L. Pollard, Nelson E. Rodgers, and Reginald E. Meade, Appleton, Wis., assignors to Western Condensing Company, San Francisco, Calif., a corporation of California No Drawing. Application November 11, 1944, Serial No. 563,082

4 Claims. (Cl. 195—42)

This invention relates to processes for the manufacture of biologically active materials such as vitamins by fermentation processes. More particularly, the invention pertains to the synthesis, from lactose-containing products (in particular, lacteal material), of riboflavin and other vitamins by the action of bacteria, and, more specifically, by the action of the bacterium Clostridium acetobutylicum.

The present application is a continuation-in-part of the application of Henry L. Pollard, Nelson E. Rodgers and Reginald E. Meade, Serial No. 439,310, filed April 17, 1942, and entitled "Process for manufacturing a vitamin concentrate" (now issued as United States Patent No. 2,369,680).

The following paragraphs describe generally a fermentation process to the improvement of which the present invention is particularly directed.

As disclosed in our copending application, we have found that the natural riboflavin content of whey or skim milk may be increased to a considerable extent by subjecting whey or skim milk under controlled conditions to the fermenting action of Clostridium acetobutylicum. Such a fermentation synthesis of riboflavin is accompanied by the formation of neutral solvents such as ethanol, acetone and butanol, and gases such as hydrogen and carbon dioxide, which can be recovered as valuable by-products.

To prepare a lactose-containing lacteal medium such as whey or skim milk for fermentation to increase its riboflavin content, it is sterilized completely or substantially completely as by heat treatment at about 250° F. for about ten to twenty minutes. In addition, the acidity of the lacteal medium is neutralized preferably to a pH of 6 or 7 by adding an alkaline reagent such as sodium, potassium or calcium hydroxide. Calcium carbonate may be added to enhance riboflavin production. The iron content of the lacteal medium preferably is adjusted to within a range of about 0.5 to less than 4.5 parts per million. Whey uncontaminated with iron, as by corrosive contact with the walls of an iron container, normally contains from 0.10 to 0.21 part per million of whey. The iron content of such whey can be adjusted to the indicated content of from 0.5 to less than 4.5 parts per million by addition of soluble ferrous salts. If the whey is contaminated with iron compounds to an extent raising its iron content to 4.5 parts per million or higher, such whey can be diluted with uncontaminated whey.

The thus prepared material cooled to a temperature of about 100° F. is placed in a fermenting container and inoculated with Clostridium acetobutylicum (such as described by McCoy, Peterson and Hastings in "Journal of Infectious Diseases," volume 39, page 457) preferably at a temperature of about 100° F. under conditions such as will prevent the introduction of iron and contaminating organisms. A starter having a suitable volume for the batch to be fermented can be prepared from a stock culture by a series of transfers to a nutrient medium, such as whey.

In general, fermentation of a batch of whey can continue for from 12 to 48 hours, or until there is no noticeable further increase in the riboflavin content.

The gases formed during fermentation can be vented from the fermenting tank as formed. The solvents formed during fermentation can be removed by fractional distillation, and after removing volatile products the fermented material can be concentrated by evaporation to produce a concentrated liquor. If desired, this liquor can be further subjected to drying to produce a powdered product.

If desired, instead of separately fractionating the solvents, they can be condensed from the vapors evolved during concentration of the fermented material by evaporation to form a water-solvent mixture from which the solvents can be removed by fractional distillation.

At some point after fermentation it is desirable to inhibit further bacterial action, as for example by heat sterilization applied as a separate step or in conjunction with concentration by evaporation.

The product obtained by the above procedure is a concentrate which can be further refined or blended with various food material for human or animal consumption. By use of the process described hereinabove, the riboflavin content of whey has been increased from about 1.4 to from 6 to 70 micrograms per milliliter (before concentration by evaporation), which corresponds to about 240 to 2800 micrograms per gram on a dried basis.

Some of the lactose is consumed in the fermenting process so that the final product contains a reduced amount of milk sugar, depending upon the extent of fermentation. The solids of the final product are the remaining solids of the whey or skim milk employed and therefore are available as food ingredients, which are used to advantage when the product is blended with other material, such as various milk products, bread and bakery products, poultry and animal feeds, We have now found that the yield of riboflavin in the fermentation process described hereinabove can be greatly improved by the incorporation with whey or other lactose-containing lacteal material to be fermented of soluble ammonium salts, such as ammonium sulfate or ammonium chloride.

It is therefore an important object of the present invention to improve the synthesis of riboflavin in the fermentation of lacteal materials by supplementing the medium with a soluble ammonium salt such as ammonium sulfate or ammonium chloride.

Other and further features and objects of the present invention will become apparent from the following detailed description and appended claims.

In proceeding according to the present invention the directions given hereinabove as applied to the methods of the copending application are followed except for the variations disclosed hereinbelow.

The soluble ammonium salts referred to hereinabove may be added to the whey medium before the medium is sterilized. In general, soluble ammonium salts may be added in amounts effecting concentrations of added $NH_4$ (added ammonium radical) ranging from 0.0001 to 0.1%. From 0.0005 to 0.33% ammonium sulfate may be added.

The type of results obtained when proceeding according to the present invention are illustrated by an experiment described hereinbelow.

The basal medium employed in this experiment was rennet whey supplemented with 4.8 parts per million zinc sulfate heptahydrate, 10 parts per billion para-aminobenzoic acid and 0.2% calcium carbonate. Ammonium sulfate in various concentrations was tested for its influence in riboflavin synthesis in the presence of varied concentrations of iron added as ferrous sulfate, as indicated in the accompanying table.

The media containing the various combinations of supplements were autoclaved in 100 milliliter volumes, inoculated with 4% of a suitable *Clostridium acetobutylicum* starter, and inoculated at 100° F. for 48 hours. The riboflavin yield in duplicate cultures are shown in the following table:

| Added $(NH_4)_2SO_4$ in parts per million | Riboflavin μg./ml., added Fe in parts per million | | | | | | |
|---|---|---|---|---|---|---|---|
| | 0.56 | 0.84 | 1.12 | 1.40 | 1.68 | 2.24 | 3.36 |
| 0 | 6.4 | 17 | 35 | 47 | 48 | 42 | 22 |
| | 5.9 | 17 | 33 | 48 | 49 | 44 | 24 |
| 6.6 | 5.9 | 15 | 36 | 47 | 58 | 47 | 25 |
| | 5.7 | 14 | 36 | 53 | 53 | 51 | 23 |
| 13.2 | 4.2 | 12 | 44 | 56 | 53 | 52 | 19 |
| | 5.1 | 11 | 44 | 54 | 51 | 48 | 21 |
| 33 | 5.5 | 8.8 | 43 | 49 | 51 | 41 | 19 |
| | 5.8 | 12 | 42 | 51 | 52 | 45 | 19 |
| 66 | 4.7 | 9.9 | 36 | 51 | 52 | 50 | 17 |
| | 5.0 | 10 | 36 | 43 | 51 | 41 | 22 |
| 132 | 5.0 | 10 | 30 | 54 | 51 | 38 | 12 |
| | 5.0 | 9.8 | 33 | 53 | 46 | 40 | 15 |
| 330 | 6.0 | 7.4 | 20 | 45 | 46 | 38 | 13 |
| | 5.9 | 7.3 | 21 | 44 | 47 | 38 | 11 |
| 660 | 5.0 | 9.8 | 52 | 51 | 49 | 27 | 6.8 |
| | 5.0 | 11 | 47 | 54 | 34 | 42 | 6.4 |
| 1,320 | 8.3 | 15 | 53 | 52 | 49 | 32 | 7.1 |
| | 7.3 | 38 | 54 | 57 | 47 | 31 | 6.5 |
| 3,300 | 22 | 63 | 63 | 48 | 48 | 32 | 7.0 |
| | 31 | 64 | 53 | | | 31 | |

As evidenced by the tabulated data, ammonium sulfate in concentrations of 6.6 to 33 parts per million consistently improved riboflavin production in the presence of 1.12 to 2.24 parts per million of added iron. High concentrations of ammonium sulfate in the range of from 1320 to 3300 parts per million likewise greatly improved riboflavin production, but only at relatively low iron levels. For instance, at a concentration of added iron of 0.84 part per million, 3300 parts per million of ammonium sulfate increase the riboflavin yield to about 130% of the maximum yield obtained over the entire iron concentration range in the absence of ammonium sulfate. But these high ammonium sulfate concentrations were quite inhibiting to synthesis in the presence of high concentrations of iron, in particular, 3.36 parts per million. The inhibition of synthesis at high iron and ammonium sulfate concentrations was noted in other experiments as well.

At intermediate ammonium sulfate concentrations, instances of definite inhibition of synthesis are to be noted. See, for example, the riboflavin yields at concentrations of added iron of 0.84 and 1.12 parts per million when 330 parts per million of ammonium sulfate were used. Instances of zones of stimulation and inhibition occurring particularly at low iron levels in cyclic sequence have been observed in several experiments at intermediate ammonium sulfate concentrations. But such cyclic inhibition is not always effected, nor is it always found at the same combination of iron and ammonium sulfate concentrations. In a series of fermentation batches, such cyclic inhibition is often cancelled out.

In general, it may be stated that ammonium sulfate is effective to improve riboflavin production. The concentration at which the ammonium salt is most effective depends upon the iron concentration. At iron concentrates in excess of 2.24 parts per million, concentrations of more than 132 parts per million of ammonium sulfate are either ineffective or inhibiting. But at other combinations of iron and ammonium ion concentrates, the average or typical effect of the addition of the ammonium ion is a better yield of riboflavin.

From a practical standpoint, it is useful to add from 1 to 1000 parts per million of $NH_4$ in the form of a soluble ammonium salt to increase riboflavin yields in a series of batches each having a total iron concentration of from 0.6 to 2.2 parts per million.

Since the ammonium salts have been found effective in extremely low concentrations, it appears unlikely that they function primarily as a nitrogen source in the usual sense of the word. For example, stimulation of synthesis occurred in the presence of 6.6 parts per million ammonium sulfate which contributed only 1.5 parts per million of nitrogen to the medium.

The above example has been given solely as illustrative of the application of the methods of this invention to the synthesis of riboflavin from lactose-containing lacteal liquids. A number of experiments of this general type form the basis for the claimed methods involving the incorporation of soluble ammonium salts with a fermenting medium. Isolated experiments may show deviations from the claimed ranges, but in a series of experiments consistently good yields of riboflavin may be obtained by maintaining the claimed ammonium salt concentration and, preferably, an iron concentration of from 0.6 to 2.2 parts per million.

In the foregoing, particular reference has been made to synthesis of riboflavin. It is to be understood, however, that other nutritive or vitamin factors, or factors of vitamin B complex may be synthesized in addition to riboflavin.

Many details of composition and procedure may be varied within a wide range without department from the principles of this invention and it is therefore not our purpose to limit the scope of the patent granted on this invention otherwise than necessitated by the scope of the appended claims.

We claim as our invention:

1. In a process for manufacturing a vitamin concentrate including the steps of synthesizing riboflavin by fermenting with *Clostridium acetobutylicum* a material selected from the group consisting of skim milk and whey, the improvement comprising providing said material in a form containing from about 0.56 to about 2.24 parts per million of iron in excess over the natural 0.1 to 0.21 part per million iron content of said material and incorporating a soluble ammonium salt with said material, the amount of soluble ammonium salt being so adjusted as to provide from about 1 to about 5 parts per million of ammonium radical when the excess iron content ranges from about 1.12 to 2.24 parts per million and to provide from about 180 to 450 parts per million of ammonium radical when the excess iron ranges from 0.56 to 1.12 parts per million.

2. In a process for manufacturing a vitamin concentrate including the steps of synthesizing riboflavin by fermenting with *Clostridium acetobutylicum* a material selected from the group consisting of skim milk and whey, the improvement comprising providing said material in a form containing from about 0.56 to about 2.24 parts per million of iron in excess of the natural 0.1 to 0.21 part per million iron content of said material and incorporating ammonium sulfate with said material, the amount of added ammonium sulfate being from about 6 to about 33 parts per million when the excess iron ranges from about 1.12 to about 2.24 parts per million and the added ammonium sulfate being about 1320 to 3300 parts per million when the excess iron ranges from about 0.56 to about 1.12 parts per million.

3. In a process for manufacturing a vitamin concentrate including the steps of synthesizing riboflavin by fermenting whey with *Clostridium acetobutylicum*, the improvement comprising providing said whey in a form containing from about 0.56 to about 2.24 parts per million of iron in excess of the natural 0.1 to 0.21 parts per million iron content of said whey and incorporating a soluble ammonium salt with said whey, the amount of soluble ammonium salt incorporated being adjusted so as to provide in said whey from about 1 to about 5 parts per million of ammonium radical when the excess iron ranges from about 1.12 to about 2.24 parts per million and to provide about 180 to 450 parts per million of ammonium radicals when the excess iron ranges from about 0.56 to about 1.12 parts per million.

4. In a process for manufacturing a vitamin concentrate including the steps of synthesizing riboflavin by fermenting whey with *Clostridium acetobutylicum*, the improvement comprising providing said whey in a form containing from about 0.56 to about 2.24 parts per million of iron in excess of the natural 0.1 to 0.21 part per million iron content of said whey and incorporating ammonium sulfate with said whey, the amount of ammonium sulfate incorporated being adjusted so as to amount to from about 6 to about 33 parts per million when the excess iron ranges from about 1.12 to about 2.24 parts per million and to amount to about 1320 to 3300 parts per million when the excess iron ranges from about 0.56 to about 1.12 parts per million.

HENRY L. POLLARD.
NELSON E. RODGERS.
REGINALD E. MEADE.

REFERENCES CITED

The following references are of record in the file of this patent:

UNITED STATES PATENTS

| Number | Name | Date |
|---|---|---|
| 1,928,379 | Hutchinson | Sept. 26, 1933 |
| 2,050,219 | Arzberger | Aug. 4, 1936 |
| 2,098,200 | Stiles | Nov. 2, 1937 |
| 2,128,845 | Myers | Aug. 30, 1938 |
| 2,202,161 | Miner | May 28, 1940 |
| 2,219,426 | Loughlin | Oct. 29, 1940 |
| 2,297,671 | Yamasaki | Sept. 29, 1942 |
| 2,369,680 | Meade et al. | Feb. 20, 1945 |